Dec. 14, 1926.  
E. G. K. ANDERSON ET AL  
1,610,646  
TEMPERATURE INDICATOR AS APPLIED TO AUTOMOBILE ENGINES  
Filed May 10, 1923
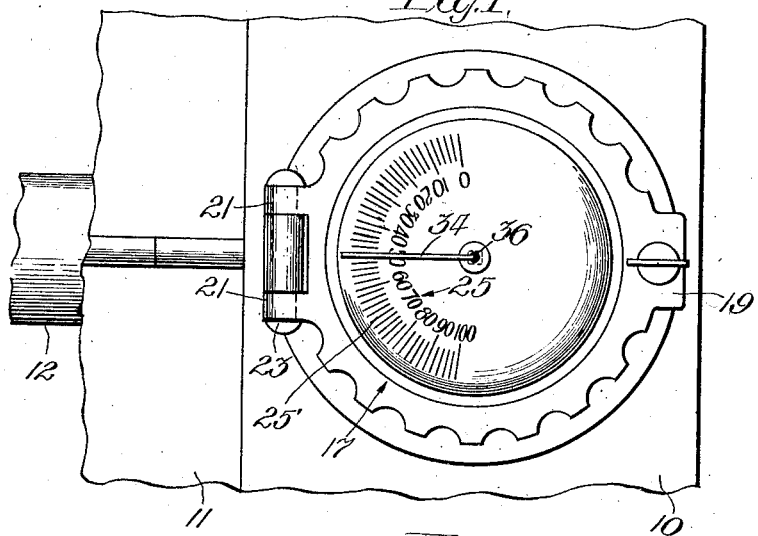
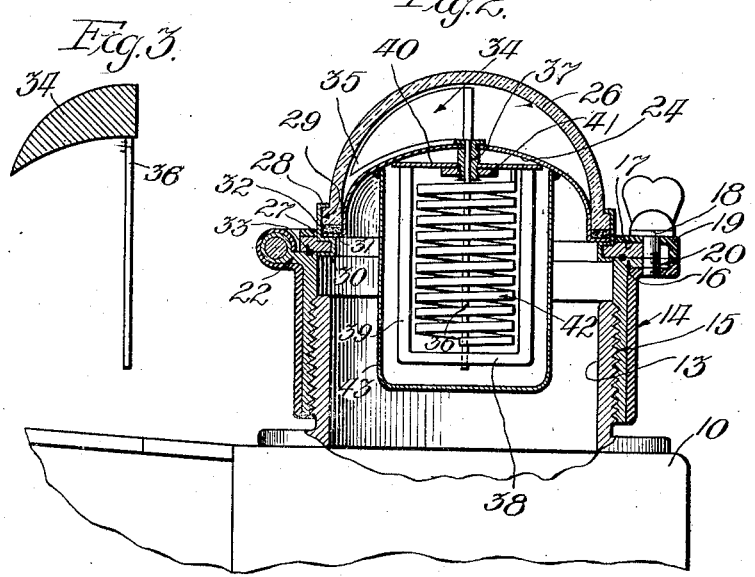
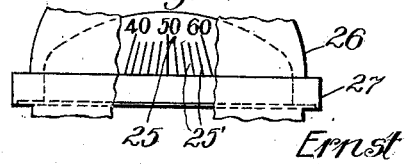
Inventor:  
Ernst G. K. Anderson.  
Harry S. Sandberg.  
by William H. Hall, their Atty.

Patented Dec. 14, 1926.

1,610,646

UNITED STATES PATENT OFFICE.

ERNST G. K. ANDERSON, OF EVANSTON, AND HARRY S. SANDBERG, OF CHICAGO, ILLINOIS.

TEMPERATURE INDICATOR AS APPLIED TO AUTOMOBILE ENGINES.

Application filed May 10, 1923. Serial No. 637,950.

This invention relates to improvements in temperature indicators for motor driven vehicles adapted to indicate the temperature of the cooling water for the internal combustion motors of such vehicles, and refers more particularly to that type of temperature indicators adapted for use in connection with the filling nozzle cap of the radiator.

Among the objects of the invention are to produce a simple and compact temperature indicator which can be readily applied to the cap of the filling nozzle of the radiator tank with but small increase of the dimensions of an ordinary cap; to produce a novel combined nozzle cap and temperature regulator supporting mechanism; to produce a temperature indicator by which the temperature of the cooling liquid can be indicated in figures on a scale that is readily adaptable to the cap and of such form as to be easily read from the position of the driver of the vehicle; to provide a very simple thermal element and its connection to the dial support on which the indicating numbers are marked, and to otherwise improve, simplify and reduce the cost of temperature regulators.

The invention consists in the combination and arrangement of parts shown in the drawings, described in the specification, and is pointed out in the appended claim.

In the drawings illustrating one embodiment of our invention:—

Figure 1 is a plan view of the indicator and the associated part of the radiator tank.

Figure 2 is a vertical section.

Figures 3 and 4 illustrate obverse and reverse sides of the indicator hand.

Figure 5 is a fragmentary detail showing a portion of the dial, its mounting and a portion of the transparent cover therefor.

As shown in the drawings, 10 designates the top of the radiator tank; 11, the hood; 12, the return water pipe leading from the motor cooling system to the tank of the radiator, and 13 the filling nozzle communicating with the tank through which cooling water is poured into said tank.

14 designates, as a whole, the cap to close said nozzle 13. It comprises a tubular portion 15 which is interiorly threaded as herein shown to engage exterior threads on the nozzle 13. The cap is closed at its upper end by a structure that comprises in part the end wall of the cap and in part elements of the indicator structure, as will hereinafter appear.

The tubular portion 15 of the cap is herein shown as fitting outside of and threaded to the nozzle 13 but this particular manner of connecting the cap to the nozzle may be varied without departing from the spirit of the invention. The said tubular portion 15 of the cap extends upwardly beyond the nozzle 13 and terminates in a radial flange 16. 17 designates a ring member that is hinged to the radial flange 16 to swing towards and away from the upper open end of the tubular portion 15 of the cap. It is provided diametrically opposite its hinge with any suitable type of down-holding or locking device, herein shown as having the form of a screw 18 which extends through an apertured lug 19 constituting part of said ring, and is threaded into a lug 20 forming a radial extension of the flange 16. The hinge herein shown comprises spaced lugs 21 which extend radially from the ring 17 and overlap the ends of a corresponding lug 22 on the flange 16, and a hinge bolt or pintle 23 which extends through registering openings in said hinge lugs.

24 designates an upwardly facing convex or hemispherical member which is suitably secured to the ring beyond the opening of the latter, as hereinafter described, to constitute the closing top of the cap and also a dial support on which are marked the indicating numbers 25 of the dial, shown in Figures 1 and 5. Said indicating members 25 are associated with the graduated lines 25' of a scale which is calibrated on the convex surface of the dial to correspond with temperature ranges of the liquid in the cooling system of the motor. The said numbers 25 are marked in bold faced type and are differentiated in color from that of the dial so that said numbers are clearly differentiated and can be easily read from the position of the driver of the vehicle. Both said numbers and the graduated lines 25' of the scale are placed sufficiently high and on the rear side of the hemispherical dial as to be clearly visible from the driver's seat.

Said hemispherical dial member 24 and the ring, connected together in the manner hereinafter described, constitutes a swinging cover for the cap which is hinged to the flange 16 and is adapted to be swung upwardly therefrom to permit water to be poured through the filling nozzle into the radiator tank.

The said hemispherical member 24, constituting a portion of the top of the cap and a dial support, is protected by a hemispherical cover member 26 made of glass or other suitable transparent material. It is of such thickness as to give the desired protection to the indicator mechanism exposed above the member 24. As herein shown, the said cover 26 and the dial supporting member 24, are fixedly attached to the ring 17 by means of a sheet metal attaching ring 27 which is formed at its upper margin with an inturned flange 28 to engage over the upper face of the base flange 29 of the transparent cover 26, and said attaching ring 27 is formed at its lower portion to provide an annular groove 30 which interlocks over the inner edge of the ring 17. The dial support and cap cover 24 is formed at its lower margin with an out-turned radial flange 31 which fits beneath the flanged base of the transparent cover 26 so as to be interlocked between said flanged base and the ring by the attaching ring 27 when the latter is formed to produce the interlocking cross section described and illustrated in Figure 2. If desired, a packing ring 32 may be interposed between the flanged base of the transparent cover 26 and the flange 31 to assist in providing a fluid-proof joint between said parts and also to afford an elastic support for the transparent cover. If found desirable, a packing ring 33 can be interposed between the ring member 17 of the cap cover and the radial flange 16.

34 designates a swinging indicating hand arranged above the dial and in the enclosure between it and the transparent cover 26. Said hand is herein shown as made of sheet metal and of general pennant shape to fit within the enclosure between the dial and said cover 26 so that its point 35 will extend outwardly over the numbers 25 and the graduated lines 26' of the dial scale. The said hand is fixed to the upper end of a vertical rock shaft 36 which extends centrally through the hemispherical dial support and cap cover and downwardly into the chamber formed in the cap and filling nozzle. The said shaft is mounted to rock in a vertical bearing sleeve 37 which is disposed centrally of said dial support and is fixed thereto in any suitable manner, as by being riveted over the upper side of said support. Said shaft 36 is guided at its lower end in a bearing at the closed portion 38 of a U-shaped frame 39, the upper ends of which are suitably and rigidly fixed to a disc 40 which is arranged centrally and beneath the dial and support. Said disc 40 is shown as fixed to the dial support by being centrally apertured to receive the lower end of the bearing sleeve 37, which latter is threaded at its lower end to receive a clamping nut 41 which bears on the lower face of said disc; the outer periphery of the disc bearing against the under concave face of the dial support. The disc 40, therefore, constitutes a means for fixedly attaching the guide frame 39 to the dial support.

The said shaft 36 is subjected at its part below the disc 40 to the influence of a thermal element, which latter is influenced by the temperature in the cap and nozzle. The thermal element herein shown has the form of a spiral spring 42, the turns of which are flat, surrounding said shaft, the upper turn thereof being attached to the disc 40 and the lower turn being attached to said shaft 36. The characteristic of this type of thermal element is that heat expands it to cause it to unwind, and a reducing temperature contracts it to permit it to wind about its axis under its inherent resiliency. Therefore, when said thermal element is heated, the shaft 36 and the indicating hand 34 are caused to turn in one direction, or in the direction towards the higher scale numbers of the dial, and when it is cooled the resiliency due to its spiral form causes the shaft and hand to be turned in the other direction, or over the numbers and scale markings indicating cooler temperatures.

In order that the position of the indicating hand may be generally determined without close inspection of the dial scale, one side of the pennant shaped indicating hand will be differentiated in color from the other side. For instance, one side thereof may be painted red and the other side green. Therefore, when the indicating hand stands at an angle to a fore and aft plane intersecting the axis of the shaft 36, the color of the exposed side of the flag will indicate to the driver the general temperature of the cooling liquid in the cooling system of the motor; and the greater angle which the said indicating hand makes with said latter plane will warn the driver of extreme temperatures, one way or the other, depending upon the angular position of said hand.

Preferably, and as herein shown, the said thermal element and its supporting frame are enclosed by a casing 43 which depends from the dial support to protect the said thermal element from injury when the cap cover is swung upwardly to replenish the radiator tank through the nozzle 13.

From what has been said above, it will be noted that the adaptation of the temperature indicator to the filling nozzle cap is simple, compact and inexpensive as compared to temperature indicators which have heretofore been applied to the filling cap, and it will be further observed that such simplicity is due to the co-operation of the essential elements of the indicator and the outer end of a standard filling cap. It will be furthermore observed that the construction described renders it unnecessary to unscrew the cap from the nozzle preparatory to filling the radiator tank and that the co-operation of the thermal element with the indicator elements are direct and are made of simple parts so as to thereby avoid liability of error in temperature indications. The threaded sleeve 15 and its top or mounting flange 16 may aptly be termed an adapter to a standard filling nozzle by which to support the swinging nozzle cover and the indicator elements carried thereby.

It will be understood that the structural details of the device described may be somewhat varied from the illustrated embodiment without departing from the spirit of the invention, as set forth in the appended claims and that the invention is not, therefore, limited to such structure except as to claims wherein the details are specifically set forth and as imposed by the prior art.

Any desired temperature scale may be employed on the dial. That herein shown is calibrated for the metric system. Preferably, the scale will be so placed on the dial that the numeral indicating efficient operating temperature for the cooling system will be near a fore and aft vertical plane that intersects the axis of the shaft 36, whereby angular displacement of the indicating hand from that plane will be an indication that the temperature of the cooling system is receding from an efficient temperature, and thus call the driver's attention to this fact.

While the cap is shown as provided with a swinging cover to close it, and which can be opened to supply water to the radiator, it will be understood that the cap can also be removed by turning it off the nozzle in the usual manner. For this purpose the rim of the swinging cover and the flange 16 may be peripherally formed with the usual hand-hold formation shown in Figure 1.

We claim as our invention:—

A combined filling nozzle cap and temperature indicator comprising a lower tubular member formed to fit upon a standard automobile radiator nozzle, a ring hinged to the upper end of said tubular member, means for locking said ring against swinging movement, a hemispherical cap lying above said ring and having a central opening and a marginal flange lying upon a ring, a transparent dome over-lying and spaced apart from said cap, means on said ring for securing said dome and cap thereto, said cap having on its exposed surface a series of graduations, an indicating finger a member to which one end of the finger is rigidly connected, said member being pivotally mounted in the opening in the cap and extending downwardly therethrough and temperature responsive actuating means for said member mounted on the underside of said cap.

In witness whereof we claim the foregoing as our invention, we hereunto append our signature at Chicago, Illinois, this 3rd day of April, 1923.

ERNST G. K. ANDERSON.
HARRY S. SANDBERG.